United States Patent [19]

Iwasa

[11] Patent Number: 5,024,796
[45] Date of Patent: Jun. 18, 1991

[54] WAVE DISSIPATING CAISSON AND METHOD FOR PRODUCING THEREOF

[76] Inventor: Nobuhiko Iwasa, 26-15, Zempukuji 1-chome, Suginami-ku Tokyo, Japan

[21] Appl. No.: 295,970
[22] PCT Filed: Apr. 21, 1987
[86] PCT No.: PCT/JP87/00255
 § 371 Date: Feb. 21, 1989
 § 102(e) Date: Feb. 21, 1989
[87] PCT Pub. No.: WO88/08469
 PCT Pub. Date: Nov. 3, 1988
[51] Int. Cl.[5] .............................. E02B 3/06; B28B 1/08
[52] U.S. Cl. ...................................... 264/69; 264/256; 405/30
[58] Field of Search ................ 405/21, 22, 25, 29-31; 264/228, 256, 333, 69

[56] References Cited

U.S. PATENT DOCUMENTS

| 3,705,228 | 12/1972 | Mattingly | 264/256 |
| 4,347,017 | 8/1982 | Chevallier | 405/29 |
| 4,372,906 | 2/1983 | del Valle | 264/333 X |
| 4,431,337 | 2/1984 | Iwasa | 405/21 X |

FOREIGN PATENT DOCUMENTS

| 55-10726 | 3/1980 | Japan . | |
| 55-062460 | 5/1980 | Japan . | |
| 62-94607 | 5/1987 | Japan . | |
| 874846 | 10/1981 | U.S.S.R. | 405/29 |
| 683360 | 11/1952 | United Kingdom | 405/29 |

Primary Examiner—Dennis L. Taylor
Assistant Examiner—Arlen L Olsen
Attorney, Agent, or Firm—Armstrong, Nikaido, Marmelstein, Kubovcik & Murray

[57] ABSTRACT

A wave-dissipating caission includes a box-shaped skeleton made up of ridge members, wherein wing members are provided. Each wing member is in the form of a trapezoid with one end thereof separated from other wing members, and an opposite end joined to other wing members. The method for producing the caisson includes the steps of providing a mold for a bottom plate portion of the caission, depositing reinforced concrete into the mold for forming the bottom plate portion, and installing a plurality of steel rods onto the bottom plate portion. The method for producing the caission further includes the step of erecting wing frames, right and left side frames, front and back frames, and an upper frame around the plurality of steel rods. Concrete is then deposited into the frames, thereby forming the caisson within the frames. Then the frames are removed from the formed caisson.

4 Claims, 8 Drawing Sheets

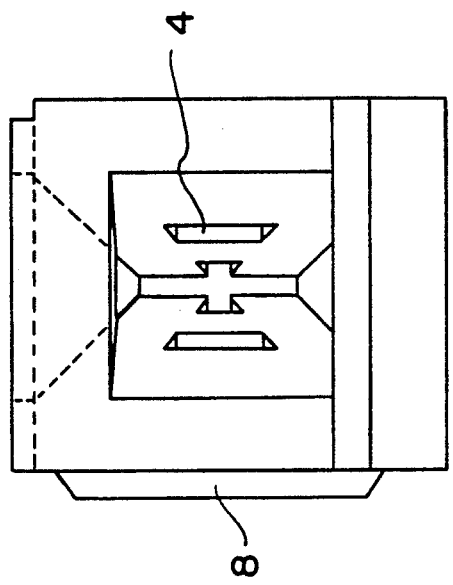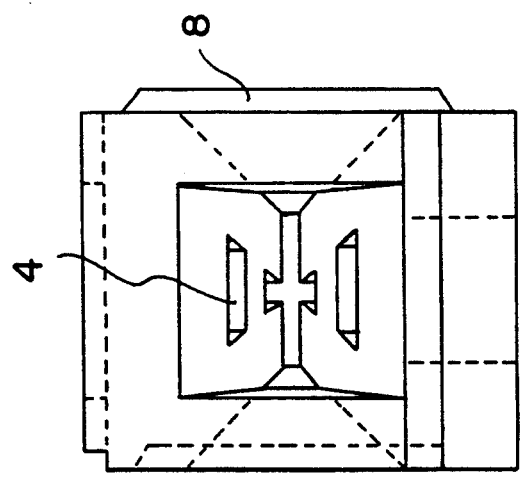

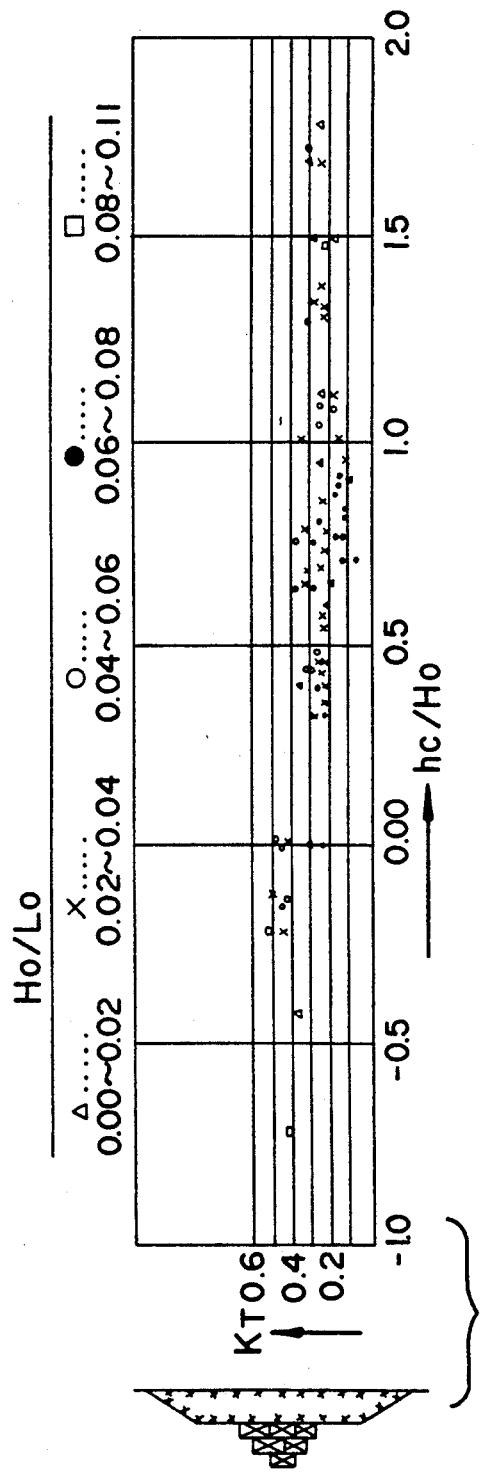
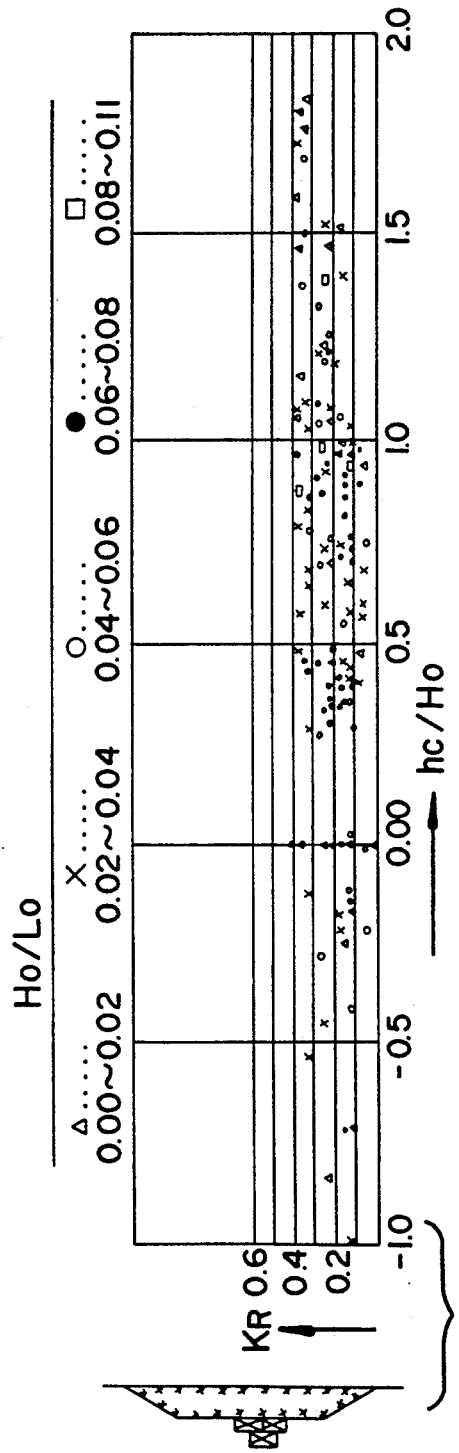
FIG. 13.
FIG. 12

WAVE DISSIPATING CAISSON AND METHOD FOR PRODUCING THEREOF

BACKGROUND OF THE INVENTION

1. Field of the Invention

This invention relates to a permeable wave dissipating caisson for dispersing the energy of waves and a method for producing the permeable wave dissipating caisson.

2. Brief Description of the Prior Art

In order to break waves so as to make a connecting facility or for use to protect houses along the shore, the construction of a breakwater has been popular for a long time.

However, if the wave height is higher than the construction, flooding occurs.

Apart from the breakwater, a fender may be provided for the wave dissipation and actually placed at the beach. There, are various kinds of constructions for wave dissipation which includes a construction along the shore and smaller constructions or simple blocks for wave dissipation may be piled up or put side by side properly in a job site.

However, if new repair or improvement of the construction is conducted in harbors, fishing ports, seashore, rivers, seaside road, fishing blocks, the construction scale of the wave dispertion becomes large and permanent durability is expected for the repaired or improved construction.

Some constructions can meet these requirement a little bit, yet insufficiently. For example, when the wave dissipating caisson which is 3×3×4.5 m and 5×5×7.5 m or more in size is constructed to a specified place, the stability becomes important more and more in view of the size and weight.

In this scale of the caissons, the producing method is as follows. The base portion is pre-molded and concrete is deposited onto the upper portion of it, but each portion cannot have consistency in construction completely.

SUMMARY OF THE INVENTION

A wave dissipating caisson comprising edge pieces including a rectangular parallelepipied skeleton and two sets of wing bodies having two pieces of trapezoidal or triangular wing with extending base, wherein the sets of wing bodies joined at the top portion, are connected each other with 90 degrees shift at said top portions in the proceeding direction of the wave relative to the skeleton while a base portion of the wing bodies fit into crosspieces or pillars consisting the edge pieces.

BRIEF DESCRIPTION OF THE ACCOMPANYING DRAWINGS

Now the present invention will be described in more detail with reference to the accompanying drawings which illustrate the preferred embodiments of the invention, in which:

FIG. 7 is a left side view of the wave dissipating caisson shown in FIG. 6;

FIG. 8 is a right side view of the wave dissipating caisson shown in FIG. 6;

FIG. 12 illustrates a diagram which shows the reflection rate of 0.2–0.4 in distribution;

FIG. 13 illustrates a diagram which shows the wave height transmission rate of 0.2–0.4 in distribution described in FIG. 12.

DETAILED DESCRIPTION OF THE PREFERRED EMBODIMENTS OF THE INVENTION

Preferred Embodiments

Figure 1:
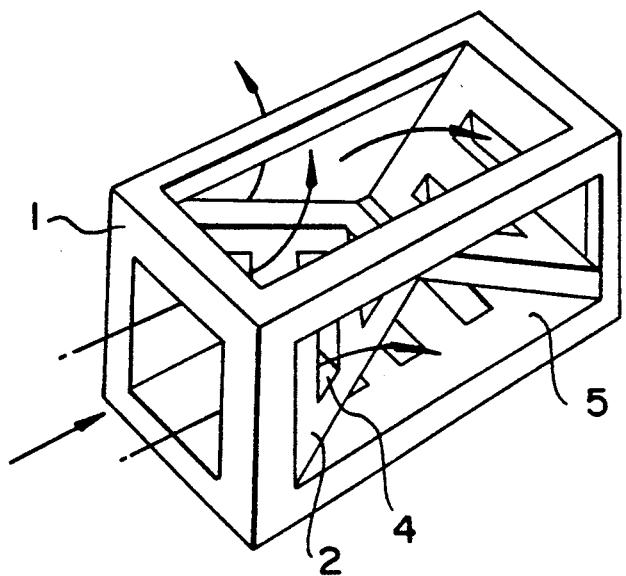
FIG. 1 is a perspective view of the wave dissipating caisson which is an embodiment of the basic concept of the present invention.
Figure 2:
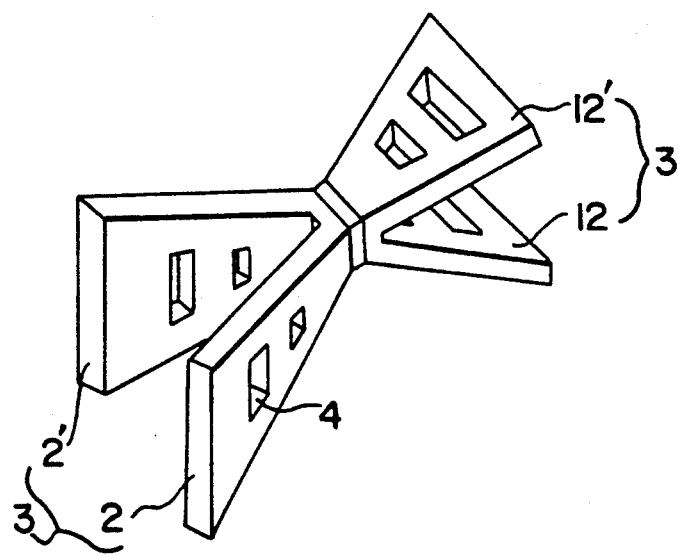
FIG. 2 is a perspective view of a internal structure in the wave dissipating caisson shown in FIG. 1.

Prefered embodiments of the present invention will be explained with reference to the drawings. FIG. 1 illustrates a perspective view of a wave dissipating caisson which is an embodiment of the basic concept of the present invention.

In FIG. 1, two sets of wing bodies 3 comprising two pieces of trapezoidal or triangular wing pieces with each wing joined at the top portion, are connected to each other with 90 degrees shift and are formed as an internal structure. The internal structure is built in a rectangular parallelepiped skeleton 1 in which a bottom plate 5 is provided.

On the other hand, each opened portion of said wing body 3 is fixed to an edge piece of said rectangular parallelepiped skeleton. The bottom plate 5 of the rectangular parallelepiped skeleton 1 has a number of holes. In case of FIG. 1, the holes are square. A round, triangular or trapezoidal holes may be provided. Furthermore appropriate holes are arranged in the trapezoidal or triangular wing pieces. Further explanation will be made hereinafter according to the drawings of FIG. 3 to FIG. 9.

Figure 3:
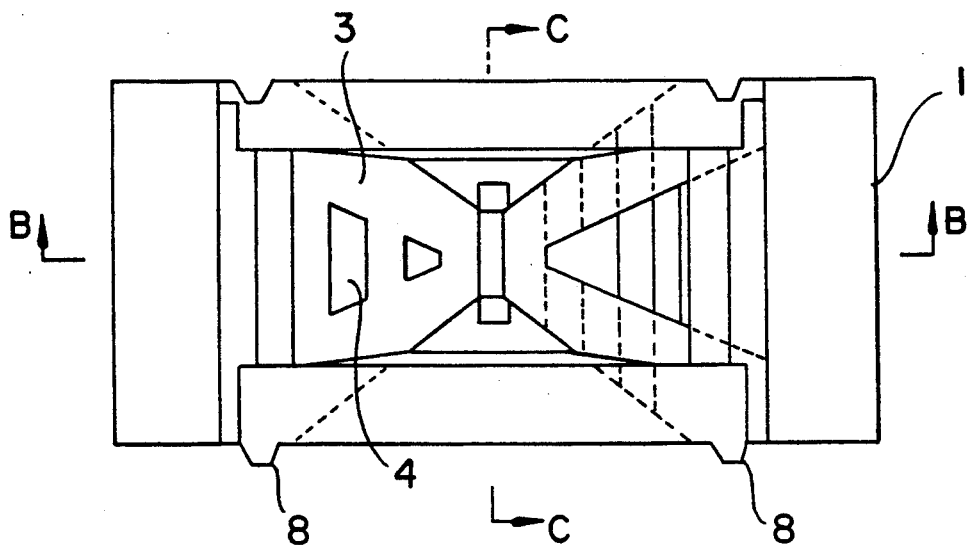
FIG. 3 illustrates a plane view of the wave dissipating caisson according to the invention.

The drawings in FIG. 3 to FIG. 8 illustrate the embodiment of the wave dissipating caisson which is moulded in accordance with the invention, FIG. 3 shows the plane view of the embodiment. In the rectangular parallelepiped skeleton 1, a side face has projections 8 and another side face has dents 9. These portions prevent caissons from slippage when a pluarity of caissons are connected.

Figure 4:
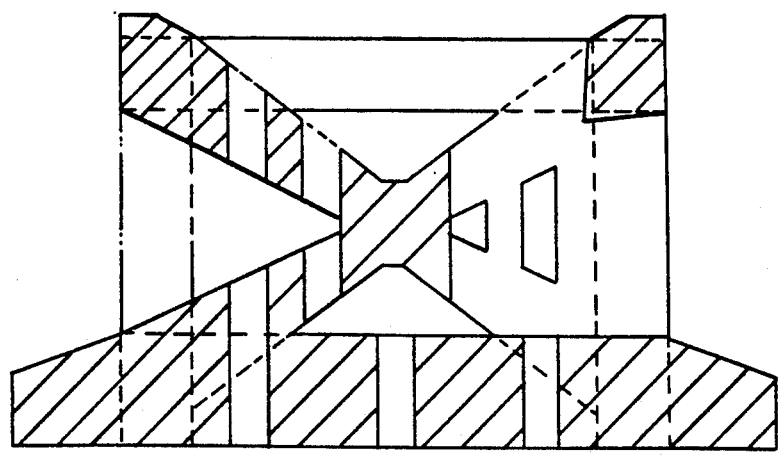
FIG. 4 is a sectional view taken along line B—B in FIG. 3.
Figure 6:
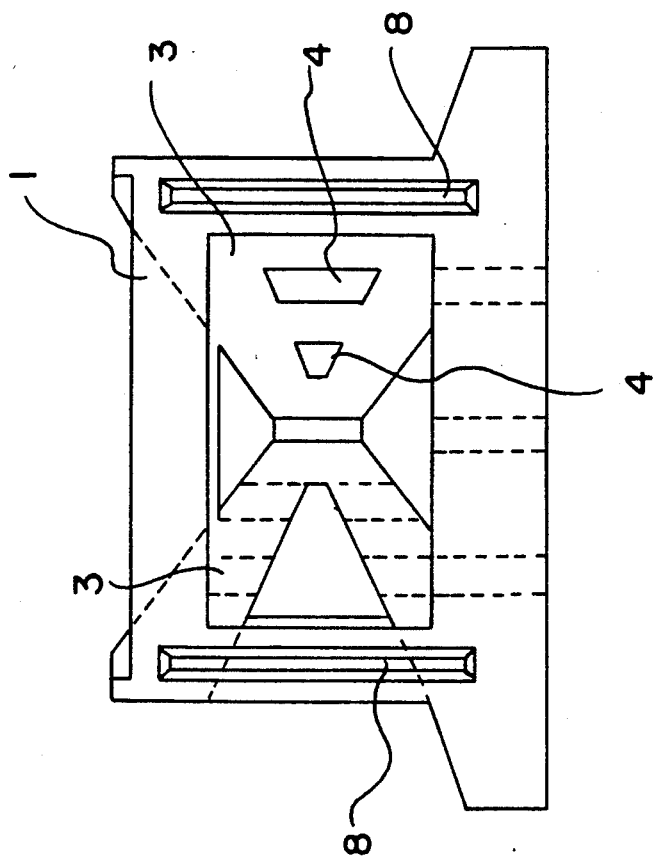
FIG. 6 is a front view of the wave dissipating caisson shown in FIG. 3.
Figure 5:
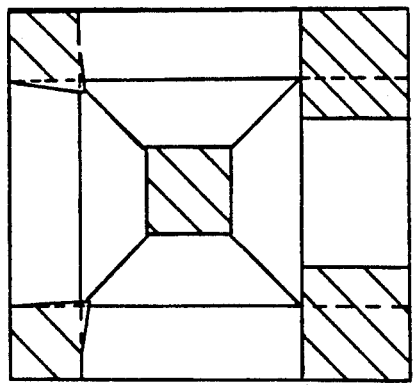
FIG. 5 is a sectional view taken along line C—C in FIG. 3.
Figure 9:
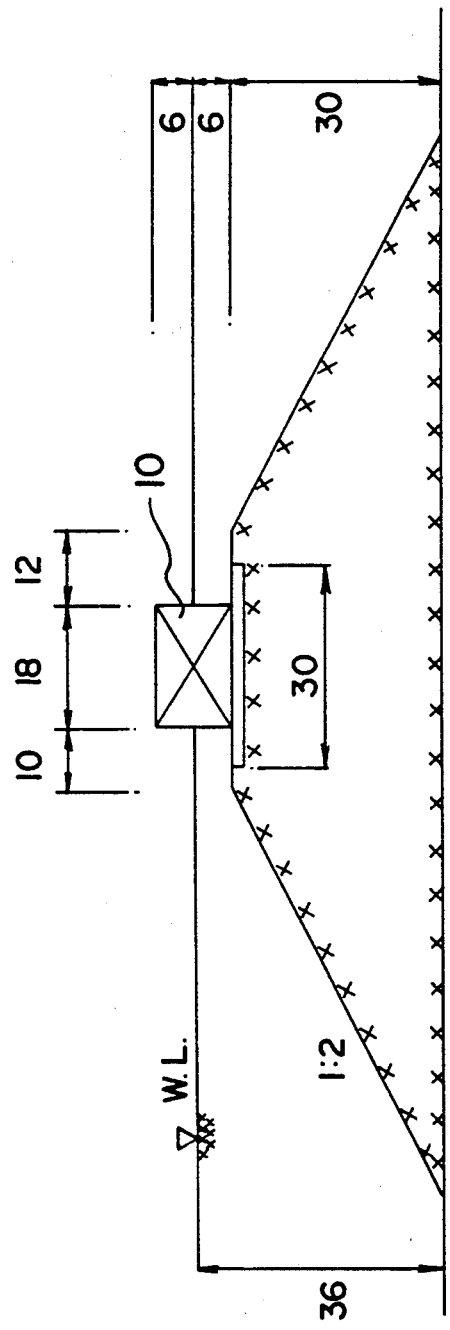
FIG. 9 illustrates a sectional view between a gravel mound and the wave dissipating caisson when an experimental test is conducted.

FIG. 4 illustrates the sectional view taken along line B—B in FIG. 3. FIG. 5 illustrates the sectional view taken along line C—C in FIG. 3. An opening is not provided symmetrically as shown in both drawings. FIG. 6 illustrates the front view of the wave dissipating caisson shown in FIG. 3. FIG. 7 illustrates the left side view of the wave dissipating caisson shown in FIG. 6. FIG. 8 illustrates the right side view of the wave dissipating caisson shown in FIG. 6.

The wave dissipating caisson of the present invention has a construction described hereinbefore. Therefore, a wave which has entered the caisson in the direction of an arrow shown in FIG. 1, can go into upper and lower directions in the wing body 3 and into the front and right and left direction through each hole 4 in the trapezoidal or triangular wing pieces 2.

The wave passing through the front side of the wing body 3 also disperses the flow to the upper, lower, right and left in the following rear wing body 3 in a similar manner. Consequently, the wave becomes turburant flow-and disappears within the skeleton.

If the wave generated in the offshore is transmitted and surges upon the coast or the shore constructions, the wave dissipating caisson of the present invention can disperse the wave to upper, lower, right and left directions from the opening of the caisson, and energy of the wave can thus be dispersed.

It is explained that the wave dissipating caisson is used for a breakwater or a shore protection. To check the wave reflection, various experimental tests are conducted with varying water depths. A wave height and a wave cycle are used for the calculation performed by the following formula using the Healey Method.

$$HR = \frac{HR}{H1} = \frac{H\max - H\min}{H\max + H\min}$$

where
H1 means the height of a incidence wave and
HR means the height of a reflection wave.

It was found that in the case of breakwater application, HR is lowered to 0.2–0.4 (i.e., the reflection wave height is 20–40% of the incidence wave height) and HR is also lowered to 0.35–0.5 for the shore protection application.

It has been confirmed that the wave transmission rate in the rear of the caisson which is calculated by the following formula becomes a value within 0.1 to 0.3. This shows that if a wave height of 1 m enters the caisson, the wave height of 10–30 cm is flown out with the use of the following equation:

$$KT = HT/H1$$

where HT means the transmission wave height.

In the experimental tests, a model of 12.0×12.0×18.0 cm in size is used as shown in FIGS. 3 to 8. The model is made of aluminum alloy and the specific gravity is 2.48, the volume is 1449 cm$^3$, the weight in air is 3.61 kg, the weight in water is 2.15 kg. The model is placed in the experimental two dimensional wave generating waterway to conduct the test. The various testing conditions are as follows.

| EXPERIMENTAL TEST | CORRESPONDING ACTUAL SIZE |
|---|---|
| Water Depth | |
| 6.00 cm | 1.50 m |
| 3.00 | 0.75 |
| 0.00 | 0.00 |
| Wave Cycle (second) | |
| 0.80 | 4.00 |
| 1.20 | 6.00 |
| 1.60 | 8.00 |
| 1.90 | 9.50 |
| Wave Height | |
| 1.95 cm | 0.50 m |
| 1.94 | 4.90 |

Water Depth: the height from the upper end of the caisson to water line, hc

Figure 10:
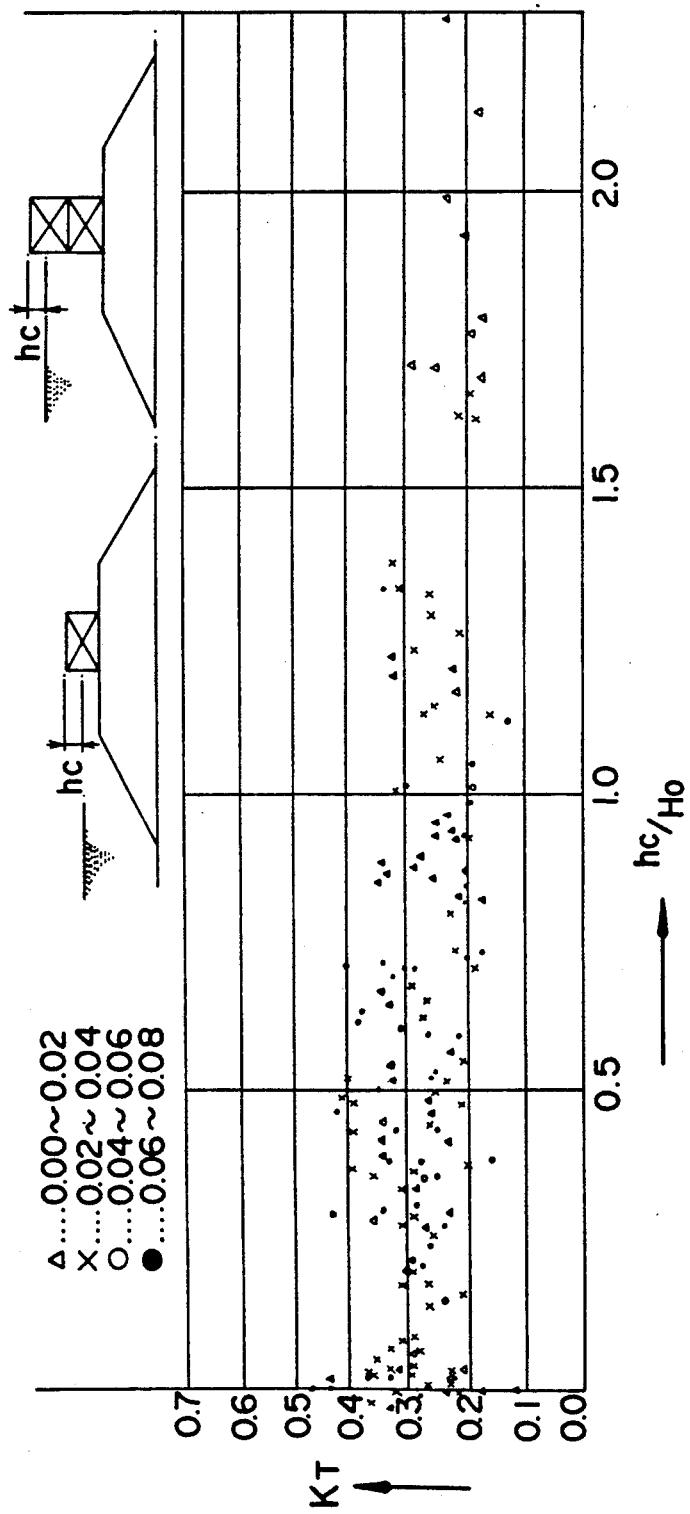
FIG. 10 illustrates a diagram showing a transmission rate.

By changing various factors, the experimental tests were conducted to measure the reflection rate as shown hereinbefore and the data charted as shown in FIG. 10.

In this case, the incidence height is converted to an offshore wave height HO by using a shallow water coefficient KS and the relationship between the relative water depth hc/HO and the reflection rate KR is calculated with the parameter of an offshore wave inclination HO/LO.

Figure 11:
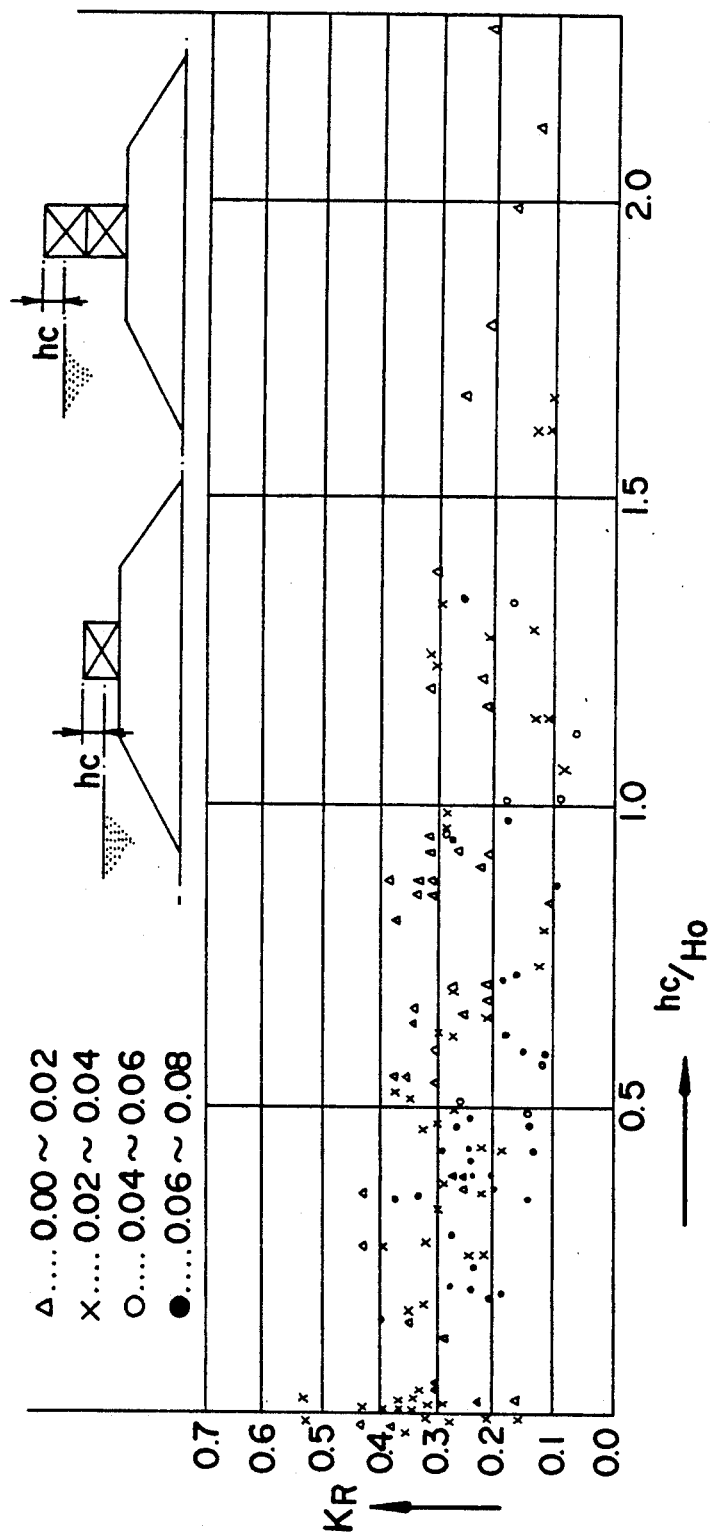
FIG. 11 illustrates a diagram showing the reflection rate.

By using the same experimental device, an experimental test result on the wave transmission rate was obtained as shown in FIG. 11.

On the other hand, piling of the wave dissipating caissons of the present invention as an offshore breakwater is examined with various values and the following table is obtained as a result. The caisson is mounted on a gravel in the inclination of 1:2 and the experimental test is conducted for two pieces and three pieces piling.

| Piling | Wave Height(m) | Cycle(second) | Water Depth(m) |
|---|---|---|---|
| 2 pieces | 0.36–2.23 | 4.10–9.60 | 6.25 |
| | 0.47–2.37 | 4.80–9.70 | 7.25 |
| | 0.33–2.98 | 4.70–9.60 | 8.25 |
| 3 pieces | 0.94–2.97 | 4.60–9.70 | 8.25 |
| | 0.95–3.81 | 4.70–9.60 | 9.25 |
| | 0.96–2.93 | 4.70–9.70 | 10.25 |

The water depth is the distance from the upper side of the caisson.

To obtain the KP value of the Hudson Formula from measured results for various conditions, observed results are shown in FIGS. 12 and 13. FIGS. 10 and 11 illustrate in the type of one-line at the top row for the offshore breakwater. Similar results are obtained for the type of two lines at the top row (so three-lines at the bottom for two stage model and four lines at the bottom for three stage model) and the type of simple piling (same row from bottom to top).

The method for producing the wave dissipating caisson in actual size is explained as follows;

1. Construction of wire rods for reinforcement.

Prior to the construction, a bottom plate portion is formed with reinforced wire rods. Assemble wire rods for reinforcement to form a pillar portion, an upper edgepiece portion, a wing piece portion on the bottom plate portion in order.

2. Deposit concrete to the base plate portion.

3. After 20 to 24 hours from the concrete depositing, remove a molding box from the bottom plate portion.

4. Assemble a molding frame for a lower wing piece portion and position it on the bottom plate portion.

5. Assemble a molding frame for a right side, a left side, a front side and a rear side portion.

6. Assemble a molding frame for the upper portion.

7. Deposit concrete into the assembled molding box. In this case, Ock=210 Kg/cm$^2$, slump=8–12 cm a crude bone material dimension=25 mm Max. are desirable.

8. Use a vibrator to prevent the deposited concrete from bubbles or lumps and leave it.

9. After 48 to 96 hours from the concrete depositing, remove the molding box.

The wave dissipating caisson can be molded in accordance with the procedure as described.

ADVANTAGES OF THE INVENTION

When piling up or lining up the caissons of the present invention, these caissons harmonize the surrounding environment with a visual shape. This caisson is formed by an easily assembled molding frame.

Moreover, the caisson has a structure in which the seawater permeates through the openings and the caisson has a secondary effect of acting as a fishing block when it is placed under the seawater.

The caisson of the present invention has the following advantages:

1. The caisson may not be turned around by wave energy.
2. The caisson is more stable than the conventional one with respect to the installation of holes in the bottom plate portion.
3. The caisson has an effect of a fishing rock.
4. The caisson can be produced with less concrete consumption and thereby reduces the cost of production because of a lot of openings provided for the caisson.

While the invention has been particularly shown and described in reference to preferred embodiments thereof, it will be understood by those skilled in the art that changes in form and details may be made therein without departing from the spirit and scope of the invention.

What is claimed is:

1. A method for producing a wave dissipating caisson comprising the steps of:

providing a mold for a bottom plate portion of said caisson;

depositing reinforced concrete into said mold for forming said bottom plate portion;

installing a plurality of steel rods onto said bottom plate portion, said plurality of steel rods extending from said bottom plate portion;

erecting wing frames, right and left side frames, front and back frames, and an upper frame around said plurality of steel rods, said frames extending from said bottom plate portion along with said plurality of steel rods;

depositing concrete into said frames;

thereby forming said caisson within said frames; and removing said frames from said formed caisson.

2. The method as in claim 1, further comprising the step of vibrating said concrete deposited in said frames.

3. The method as in claim 1, wherein said step of erecting said frames includes the step of erecting said side frames for forming side portions of said caisson having projections and groove portions opposite said projections.

4. The method as in claim 1, wherein said step of erecting said frames includes the step of erecting said wing frames for forming wing portions of said caisson having apertures passing therethrough.

* * * * *